(12) United States Patent
Hoysak

(10) Patent No.: US 9,192,147 B2
(45) Date of Patent: Nov. 24, 2015

(54) PLATFORM BIRD FEEDER WITH AN ADJUSTABLE WOBBLING BAFFLE

(71) Applicant: Woodstream Corporation, Lititz, PA (US)

(72) Inventor: Judith Kim Hoysak, Lancaster, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 94 days.

(21) Appl. No.: 13/865,468

(22) Filed: Apr. 18, 2013

(65) Prior Publication Data

US 2014/0311413 A1 Oct. 23, 2014

(51) Int. Cl.
*A01K 39/014* (2006.01)
*A01K 39/01* (2006.01)

(52) U.S. Cl.
CPC ........... *A01K 39/014* (2013.01); *A01K 39/0113* (2013.01); *Y10T 29/49948* (2015.01)

(58) Field of Classification Search
CPC .... A01K 39/00; A01K 39/01; A01K 39/0113
USPC ..................... 119/57.8, 57.9, 52.3, 61.1, 52.2
See application file for complete search history.

(56) References Cited

U.S. PATENT DOCUMENTS

| | | | | |
|---|---|---|---|---|
| 2,856,898 A | * | 10/1958 | Doubleday et al. | 119/57.9 |
| 4,030,451 A | * | 6/1977 | Miller | 119/57.9 |
| 4,102,308 A | * | 7/1978 | Kilham | 119/52.3 |
| 4,207,839 A | * | 6/1980 | Barry | 119/57.9 |
| 4,821,681 A | * | 4/1989 | Tucker | 119/51.01 |
| 5,894,813 A | | 4/1999 | George | |
| 2012/0037080 A1 | * | 2/2012 | Hepp et al. | 119/52.3 |

* cited by examiner

*Primary Examiner* — Monica Williams
*Assistant Examiner* — Magdalena Topolski
(74) *Attorney, Agent, or Firm* — Jacobson Holman, PLLC.

(57) ABSTRACT

A platform bird feeder is provided including a base platform with a seed tray, a baffle and a center pole having a bottom end connected the tray, the baffle being tiltably and adjustably mounted to the pole above the base. Preferably, the seed tray has a seed protecting grate to hinder squirrels from accessing the seed in the tray. The height of the baffle above the seed tray may be adjusted up and down to allow the user to increase and decrease the seed access space, respectively, between the baffle and the tray. When the baffle is at a desired height, it is secured in place by an adjustable securing mechanism that, while holding the baffle at the desired height, allows the baffle to tilt or wobble when sufficient weight is placed on one side of the baffle.

13 Claims, 16 Drawing Sheets

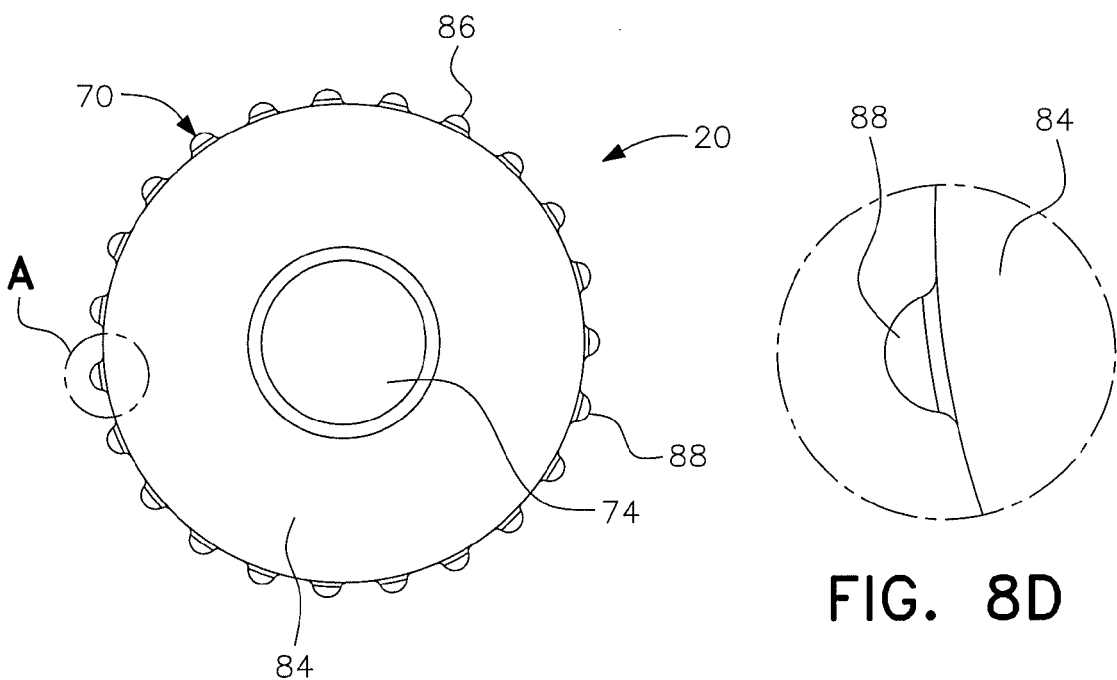
FIG. 8C
FIG. 8D
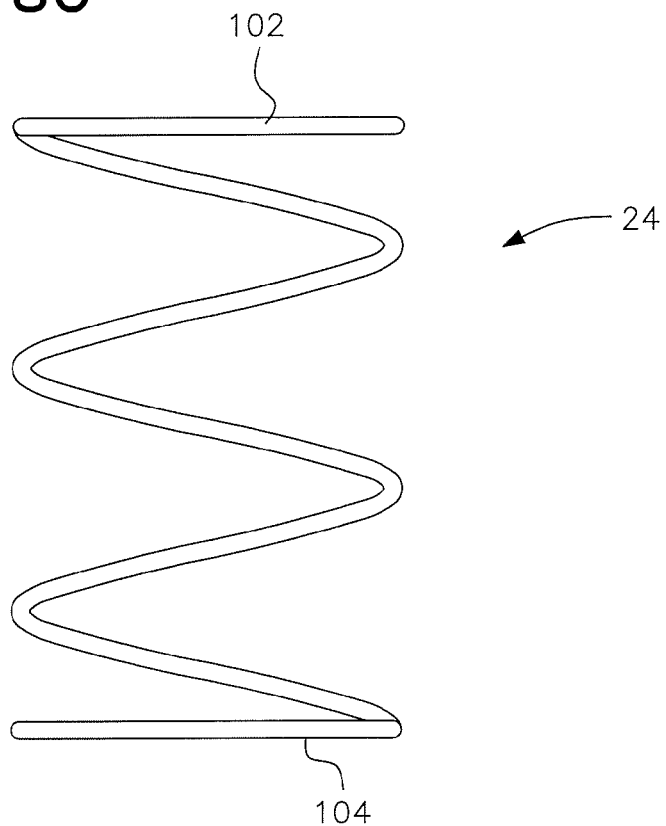
FIG. 9

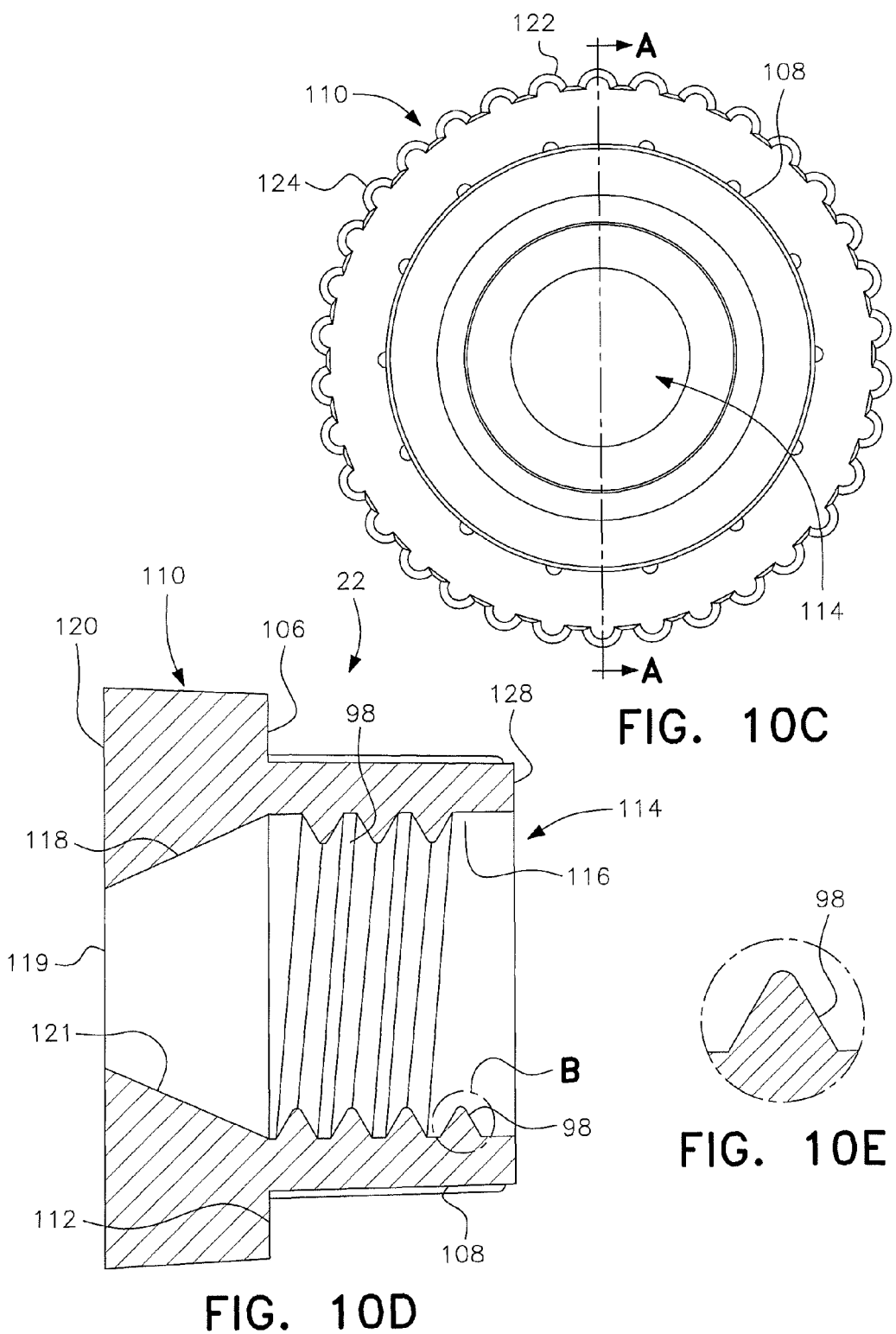

PLATFORM BIRD FEEDER WITH AN ADJUSTABLE WOBBLING BAFFLE

BACKGROUND OF THE INVENTION

1. Field of the Invention

The present invention is related to the field of wild bird care and feeding and, more particularly, to an improved bird feeder having a baffle, the height of which may be adjusted by the user and that is able to tilt when sufficient weight is placed on one side thereof.

2. Description of the Related Art

Feeding wild birds is a popular activity for many people. Platform bird feeders are useful and versatile feeders that are attractive to a wide variety of birds ranging from small to large in size. Larger birds can deter smaller birds from perching and eating from the platform feeders. Squirrels are also a problem as they are quite attracted to the platform and sit thereon while eating, effectively monopolizing the feeder.

Accordingly, a need exists for a platform bird feeder that has an adjustable and tiltable baffle to prevent larger birds and squirrels from gaining easy access to the bird seed in the feeder.

SUMMARY OF THE INVENTION

In view of the foregoing, the present invention is directed to a platform bird feeder having a seed tray, a baffle and a center pole that suspends the tray and supports the baffle above the tray. Preferably, the seed tray has a seed protecting grate to hinder squirrels from accessing the seed commonly placed in platform feeder trays. In its preferred shape, the seed tray and baffle are generally circular, and the baffle is dome-shaped.

The height of the baffle above the seed tray may be adjusted up and down to allow the user to increase and decrease the seed access space, respectively, between the baffle and the tray. When the baffle is at a desired height, it is secured in place by a locking bolt on top of the baffle that passes through an aperture in the center of the baffle, and a locking nut and spring on the underside of the baffle. The bolt includes a longitudinal bore through which the pole passes, and at least one relief cut that allows the bolt to pinch the pole when the locking nut is tightened, securing the bolt, and thereby the baffle, at the desired height.

The threaded part of the bolt extending through the baffle aperture is received within the center of the spring and into the locking nut. As the locking nut is tightened, the spring, which is positioned on the locking nut, around the locking bolt and underneath the baffle, is compressed and the baffle is thereby supported on top of the spring. When sufficient weight is placed on one side of the baffle, the spring is further compressed on that side, allowing the baffle to wobble and pivot to a tilted position.

Accordingly, it is an object of the present invention to provide a platform bird feeder with an adjustable, wobbling baffle that hinders the access of large birds and/or squirrels to seed on the platform.

Another object of the present invention is to provide a platform bird feeder with adjustable baffle in accordance with the preceding object that has a center pole for suspending the platform, the baffle being movable up and down on the center pole and then secured by the user at a desired height above the platform.

A further object of the present invention is to provide a platform bird feeder with adjustable baffle in accordance with the preceding objects in which the baffle is secured with a locking bolt on top of the baffle and a locking nut and spring on the underside of the baffle, the bolt having at least one relief cut enabling the bolt to pinch onto the pole when the nut is tightened.

Yet a further object of the present invention is to provide a platform bird feeder with adjustable baffle in accordance with the preceding objects in which tightening of the nut compresses the spring against the baffle so that the baffle is supported on top of the spring, the spring enabling the baffle to tilt when sufficient weight is applied on one side of the baffle.

Another object of the present invention is to provide a platform bird feeder with adjustable baffle in accordance with the preceding objects that includes a base platform having a generally flat seed tray and upwardly directed rim for holding the seed, the top of the tray being covered with a grate to protect the seed from squirrels.

Yet another object of the present invention is to provide a platform bird feeder with adjustable baffle in accordance with the preceding objects in which the center pole includes a hook at the top for hanging the feeder on a support element.

Still another object of the present invention is to provide a platform bird feeder with adjustable baffle in accordance with the preceding objects that is not complex in structure and which can be manufactured at low cost and that effectively deters large birds and squirrels from gaining access to the seed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8C is a top view of the bolt shown in FIGS. 8A and 8B.

FIG. 8D is an enlargement of Detail A of FIG. 8C.

FIG. 9 is a side view of the spring for the platform bird feeder shown in FIGS. 1-3.

FIG. 10C is a top view of the locking nut shown in FIGS. 10A and 10B.

FIG. 10D is a cross sectional view taken along line A-A of FIG. 10C.

FIG. 10E is an enlargement of Detail B of FIG. 10D.

DETAILED DESCRIPTION OF THE PREFERRED EMBODIMENTS

Figure 1:
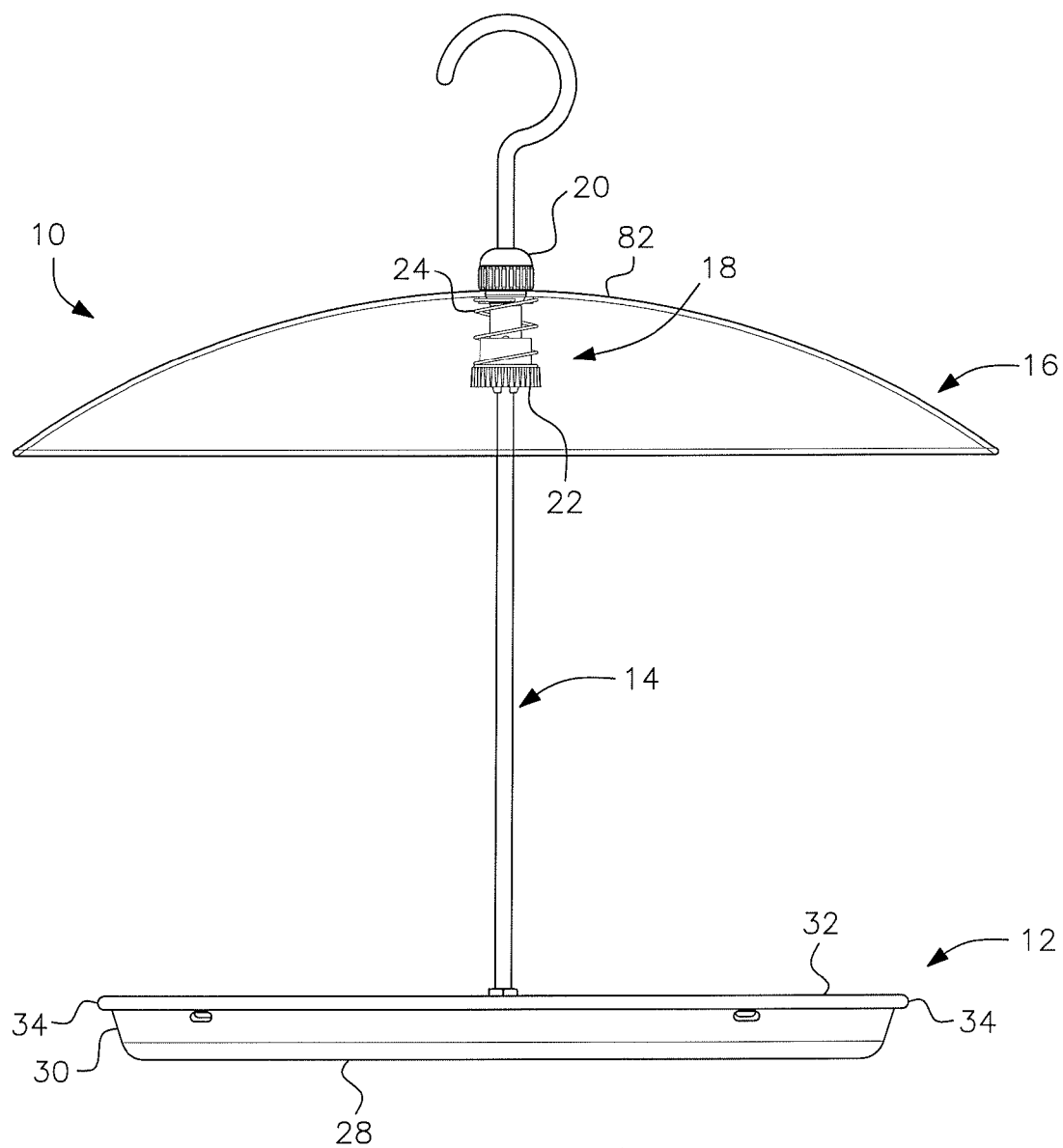
FIG. 1 is a side view of a platform bird feeder with adjustable baffle as assembled in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiment and alternate structure, specific terminology will be resorted to for the sake of clarity. It is to be understood that each specific term includes all technical equivalents which operate in a similar manner to accomplish a similar purpose.

Figure 2:
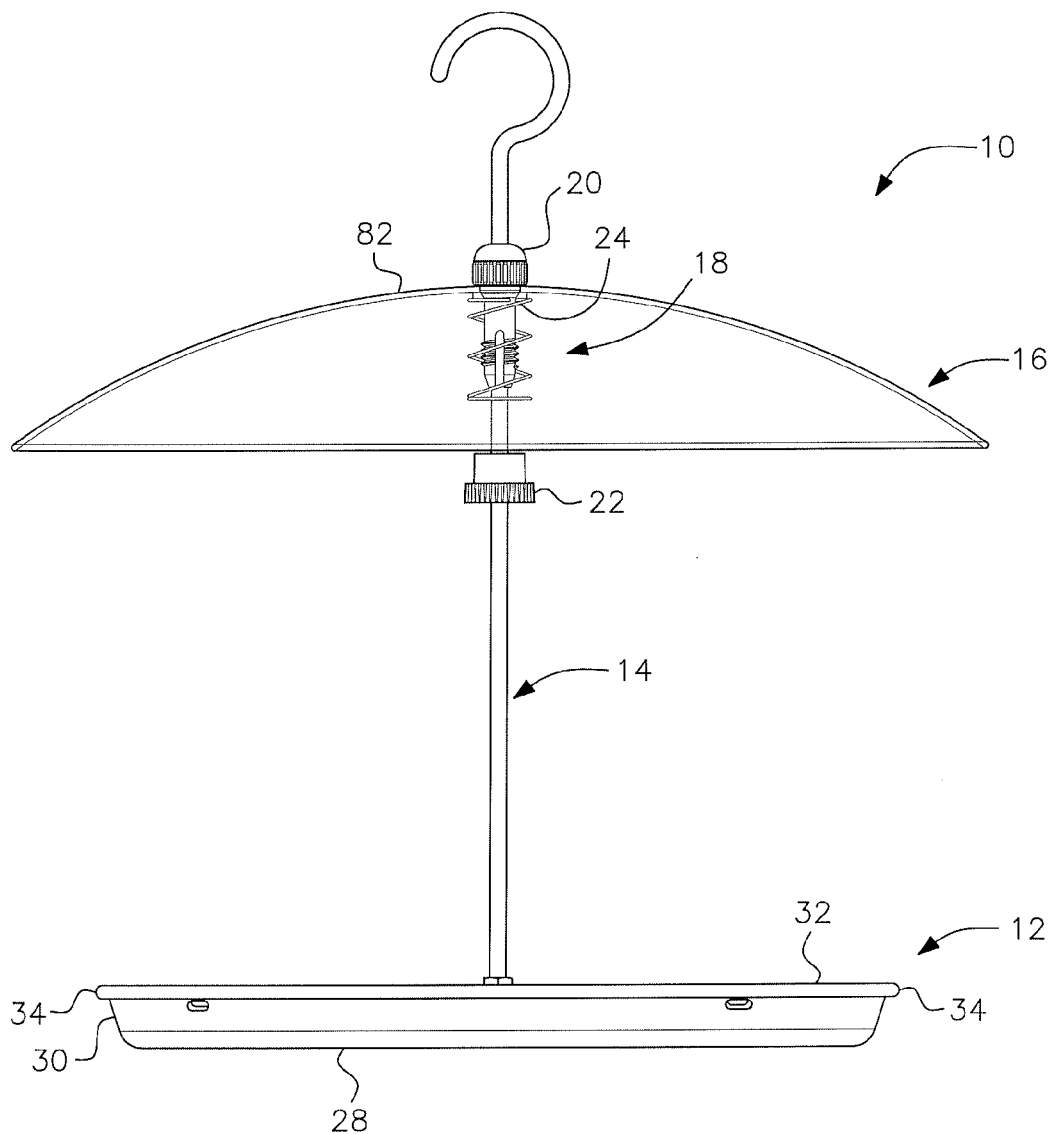
FIG. 2 is a side view of the platform bird feeder shown in FIG. 1 with the locking nut unlocked from the locking bolt to release the spring tension against the baffle.
Figure 3:
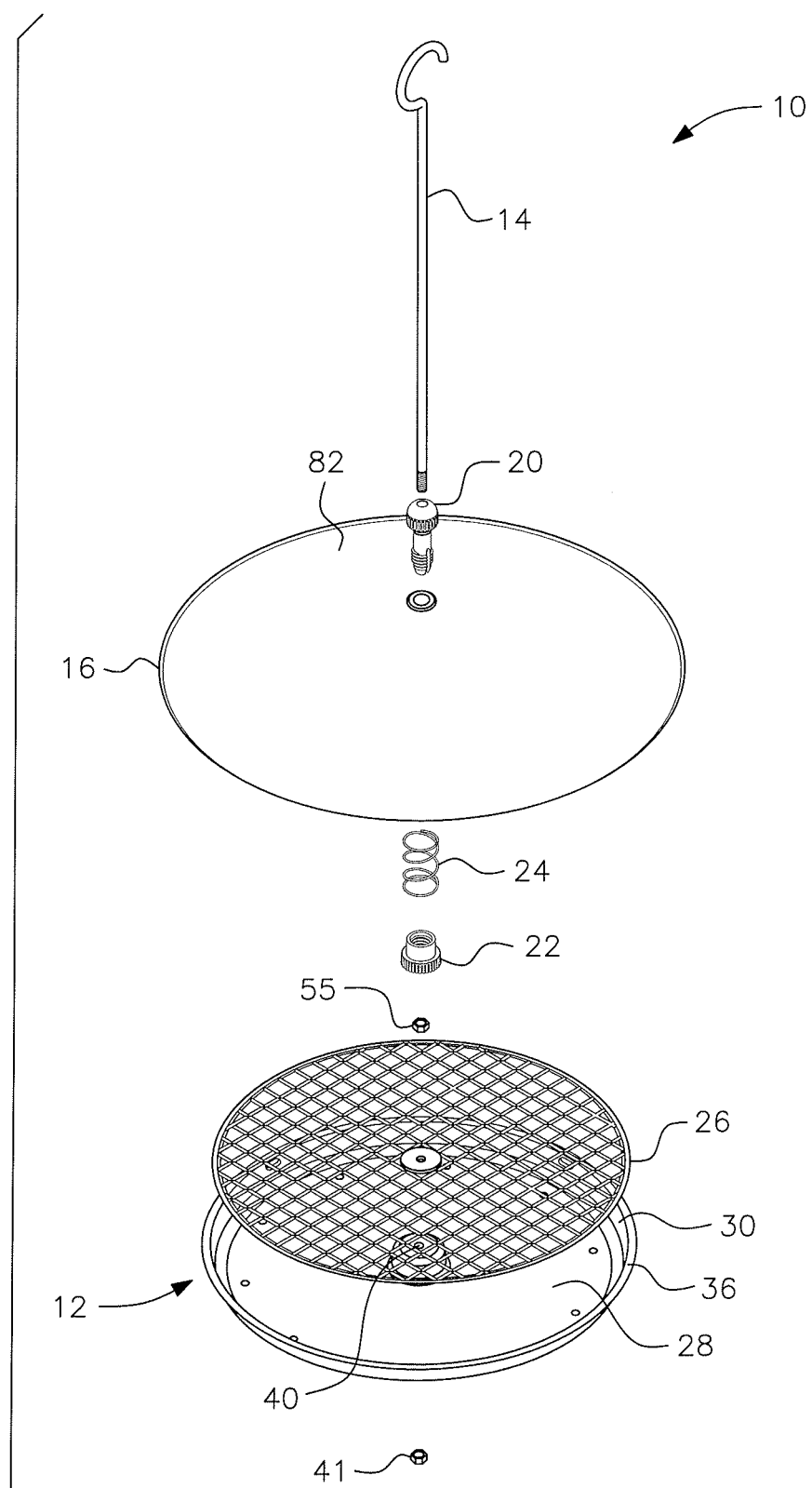
FIG. 3 is an upper perspective exploded view of the components of the platform bird feeder with adjustable baffle shown in FIGS. 1 and 2.

As shown in FIGS. 1-3, the present invention is directed to a platform bird feeder with adjustable baffle generally designated by reference numeral 10. The feeder 10 includes a base platform generally designated by reference numeral 12, a center pole generally designated by reference numeral 14, and a baffle generally designated by reference numeral 16. The baffle is adjustably secured to the center pole 14 using an adjustable securing mechanism generally designated by reference numeral 18. In the embodiment shown, the adjustable securing mechanism 18 includes a locking bolt 20, a locking nut 22 and a spring 24. As can be seen in FIG. 3, the feeder 10 also includes a mesh grate 26 fitted in the base platform 12 to block squirrels from accessing seed held in the platform.

Figure 4A:
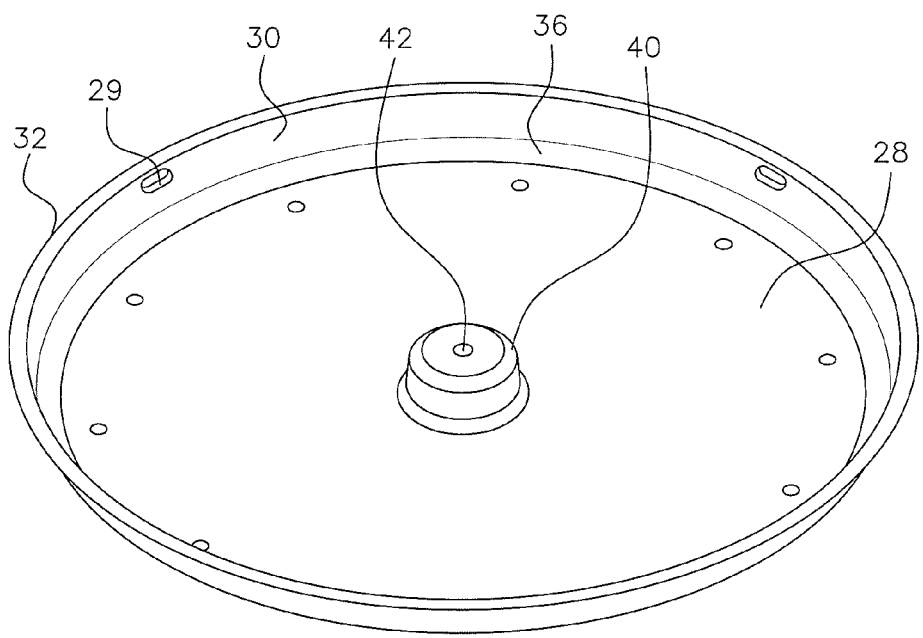
FIG. 4A is an upper side perspective view of the base platform for the platform bird feeder shown in FIGS. 1-3.
Figure 4B:
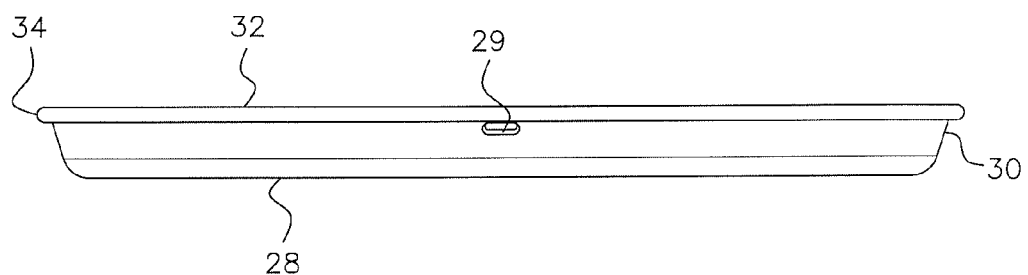
FIG. 4B is a side view of the base platform for the platform bird feeder shown in FIG. 4A.
Figure 4C:
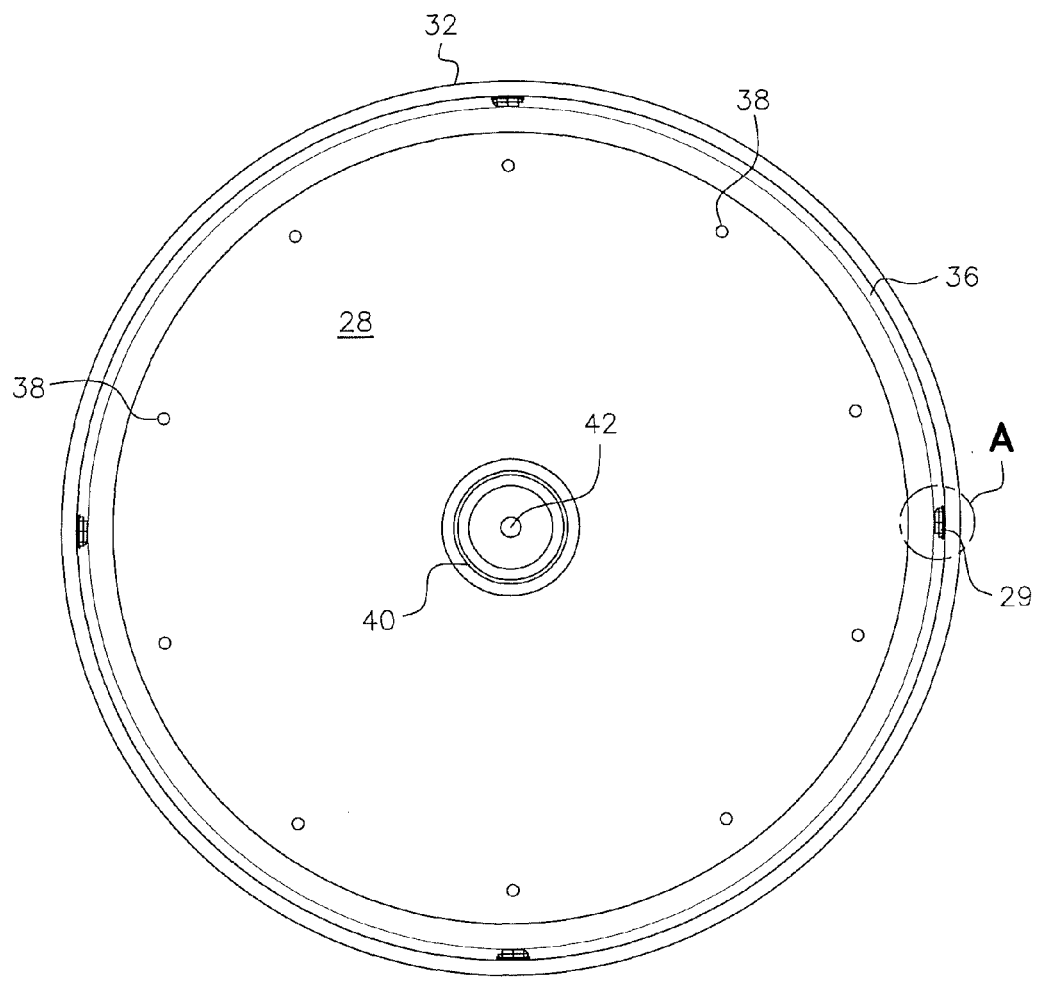
FIG. 4C is a top view of the base platform for the platform bird feeder shown in FIGS. 4A and 4B.

As shown in FIGS. 4A, 4B and 4C, the base platform 12 is generally circular with a substantially flat seed tray 28 and upwardly directed base rim 30. The rim includes an upper edge 32 and a stepped edge or lip 34 that provides an annular ledge 36 for supporting the mesh grate 26. The seed tray 28 is provided with small apertures 38 to allow for drainage of water. The center of the seed tray 28 has an upwardly projecting pole mounting boss 40 that preferably includes an internally threaded central aperture 42 to engage the external threads 60 on the bottom end 58 of the center pole 14. The boss is hollow such that the bottom of the base platform has a cylindrical recess (not shown) corresponding in size to the boss. Alternatively, a hex nut 41 may be welded inside the recess so that the center of the nut 41 is in alignment with the central aperture 42. In this alternate configuration, the threaded end of the center pole goes through the central aperture, which may not be threaded, and is threadedly engaged with the inner threads on the nut 41 that is welded in the recess on the bottom of the base platform. It is preferred, however, to have internal threads within the central aperture 42 so that the nut 41 is not necessary. The base platform 12 is preferably made of metal although other materials such as hard plastic and the like could be used.

Figure 4D:
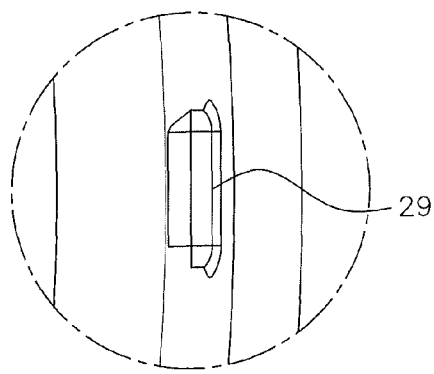
FIG. 4D is an enlargement of Detail A of FIG. 4C.
Figure 5A:
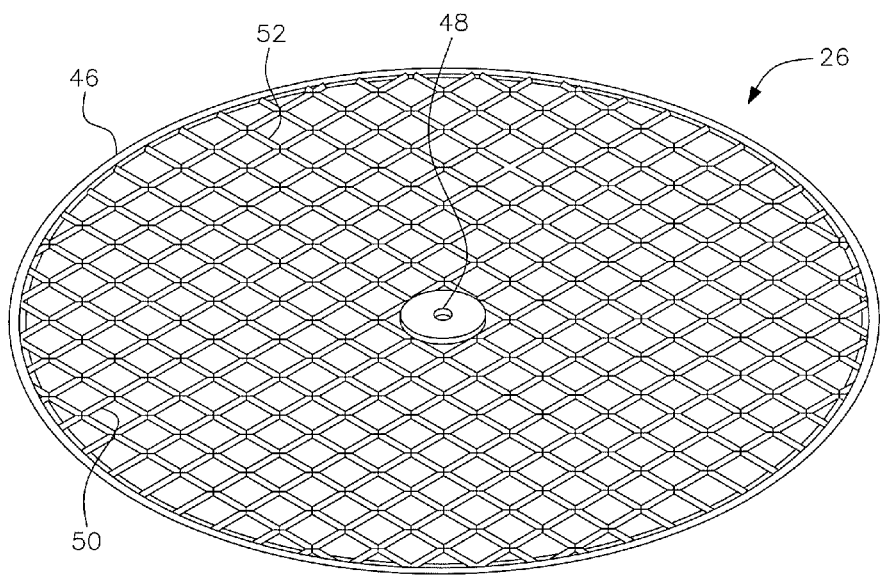
FIG. 5A is an upper side perspective view of the grate for the platform bird feeder shown in FIG. 3.
Figure 5B:
FIG. 5B is a side view of the grate shown in FIG. 5A.
Figure 5C:
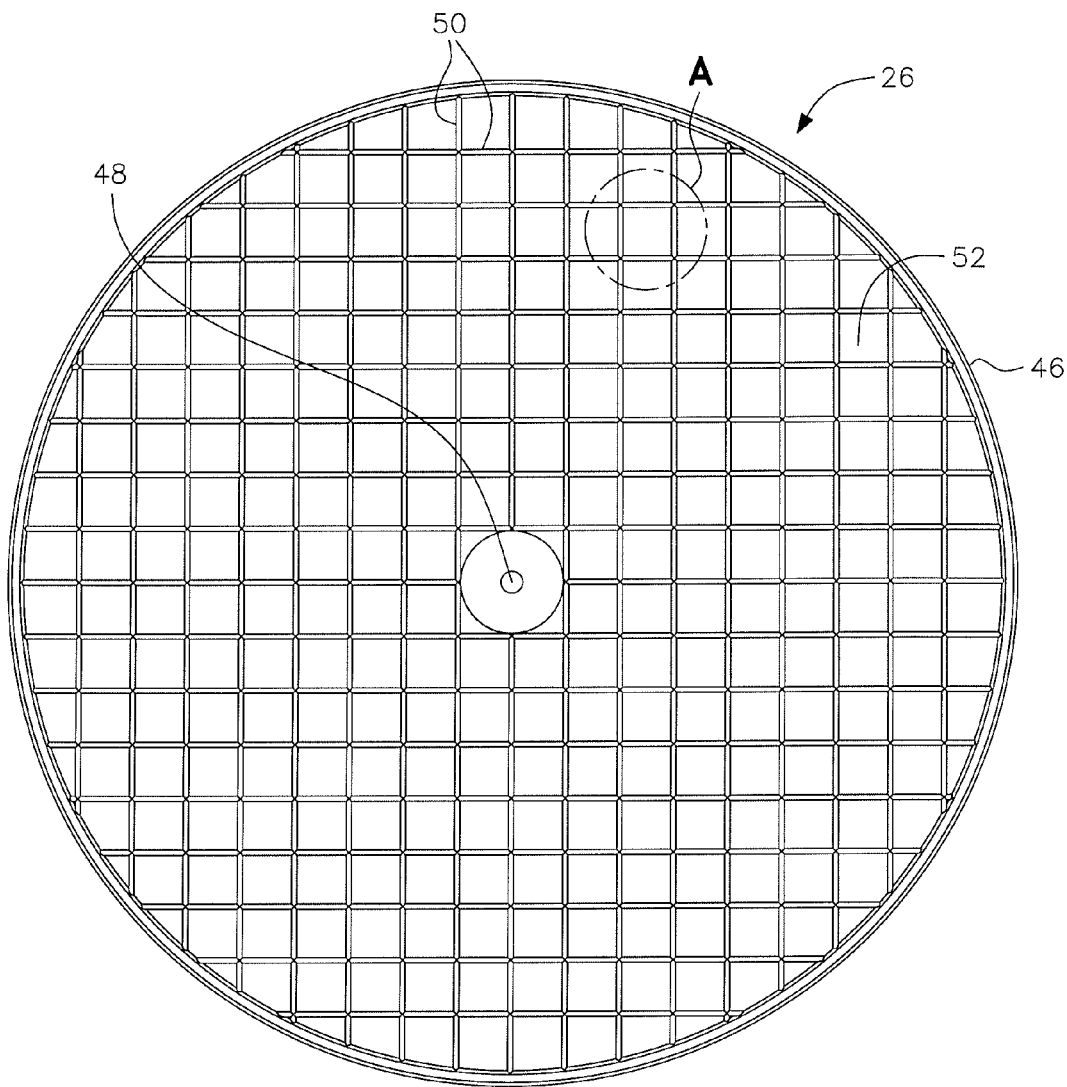
FIG. 5C is a top view of the grate shown in FIGS. 5A and 5B.
Figure 5D:
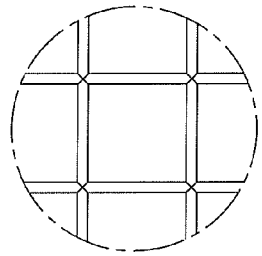
FIG. 5D is an enlargement of Detail A of FIG. 5C.

Rather than relying on the annular ledge 36, the rim 30 of the seed tray 28 may be provided with at least one inwardly directed flange 29; in the embodiment shown in FIGS. 4A-4D, four flanges 29 are provided spaced around the circumference of the rim. FIG. 4D shows detail A from FIG. 4C depicting one of the flanges. If the spaced flanges 29 are provided, the flanges 29 support the grate on the base platform in a manner similar to the way in which the annular ledge 36 supports the grate in a seed tray that does not have the flanges.

FIGS. 5A-5D are various views of the mesh grate generally designated by reference numeral 26 that is shown in FIG. 3. The grate 26 includes a circular rim 46 that is supported on the ledge 36 formed by the rim lip 34 of the base rim 30 when the grate is secured to the base platform 12. The grate 26 includes a central aperture 48 that aligns with the central aperture 42 in the pole mounting boss 40 to receive and position the center pole 14. The body of the grate 26 includes a plurality of overlapping strands 50 that form generally square openings 52. The strands 50 could overlap at other angles to form openings of other shapes as would be understood by persons of ordinary skill in the art. As with the base platform 12, the grate 26 is preferably made of metal although other materials such as hard plastic and the like could be used.

Figure 6:
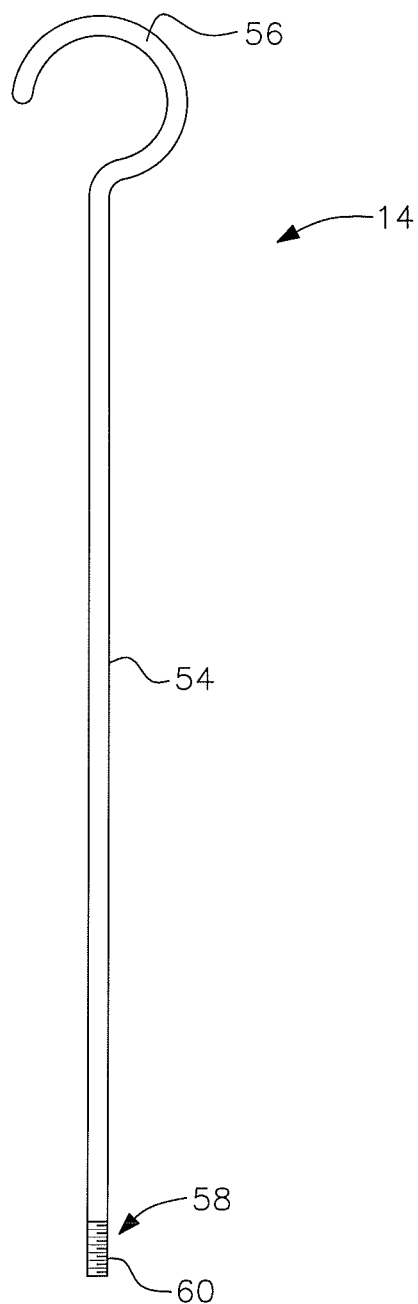
FIG. 6 is a side view of the center pole for the platform bird feeder shown in FIGS. 1-3.

The center pole 14 is illustrated in FIG. 6. As shown, the pole includes an elongated straight portion 54 and a hooked end 56. The bottom end 58 of the straight portion 54 is provided with threads 60 for engagement with the mounting boss 40 in the tray 28 of the base platform 12. Before threading the pole into the boss, a nut 55 is screwed onto the threads 60. The nut 55 serves to lock and stabilize the grate 26 and the center pole 14 when the pole 14 is fully screwed into the boss. The hooked end 56 is shown as semi-circular, but other shapes or angles could be used as would be understood by persons of ordinary skill in the art.

Figure 7A:
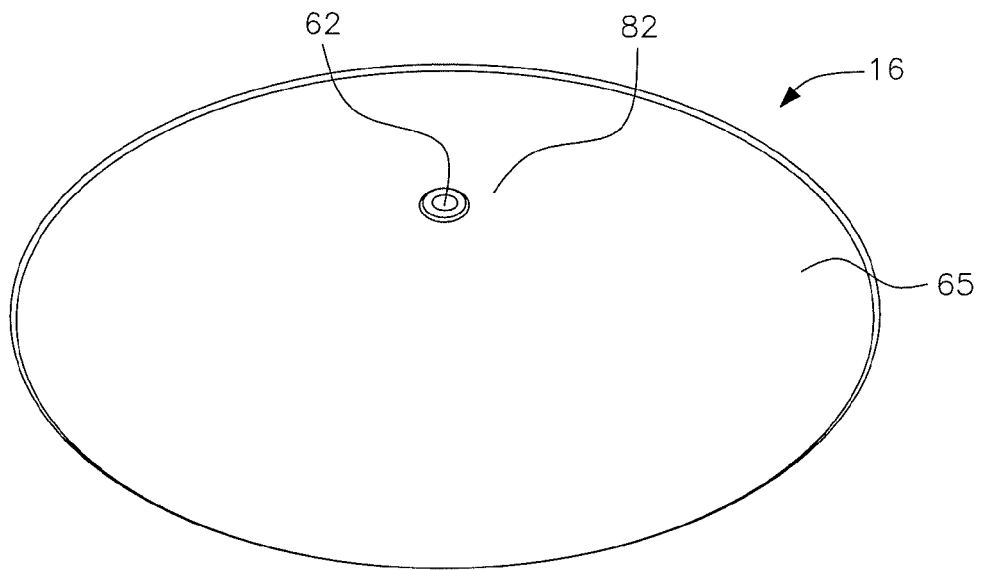
FIG. 7A is an upper side perspective view of the baffle for the platform bird feeder shown in FIGS. 1-3.
Figure 7B:
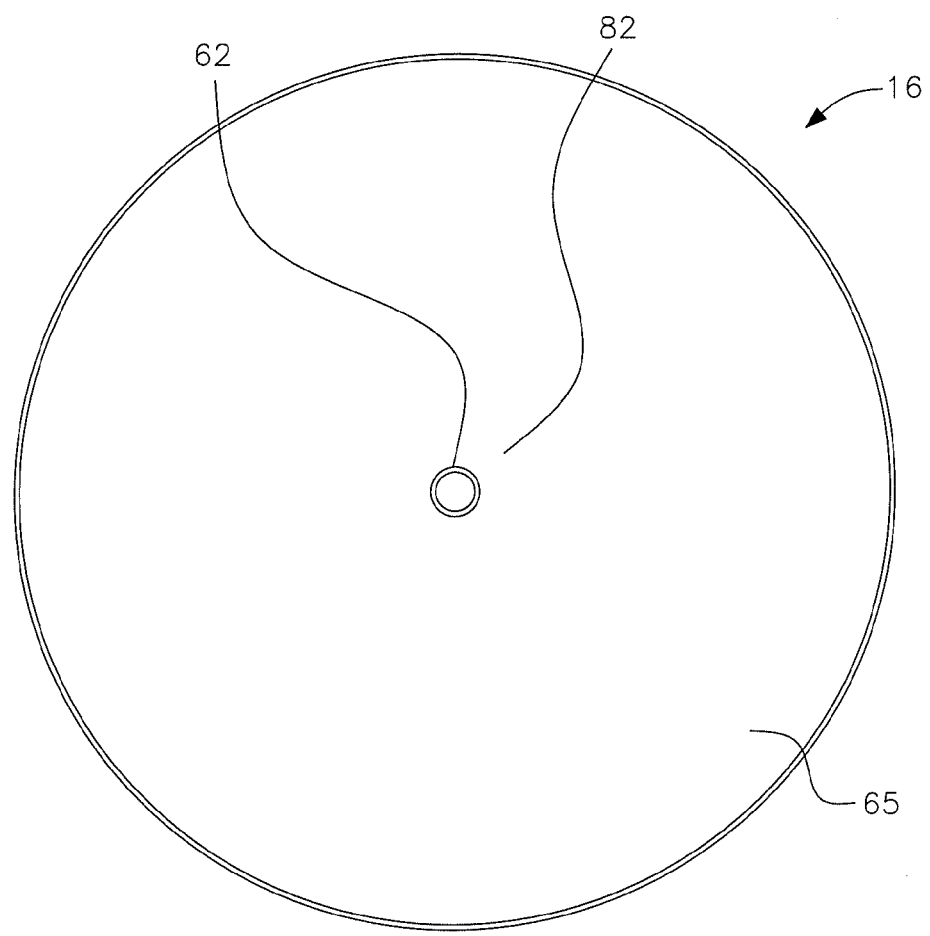
FIG. 7B is a top view of the baffle shown in FIG. 7A.
Figure 7C:
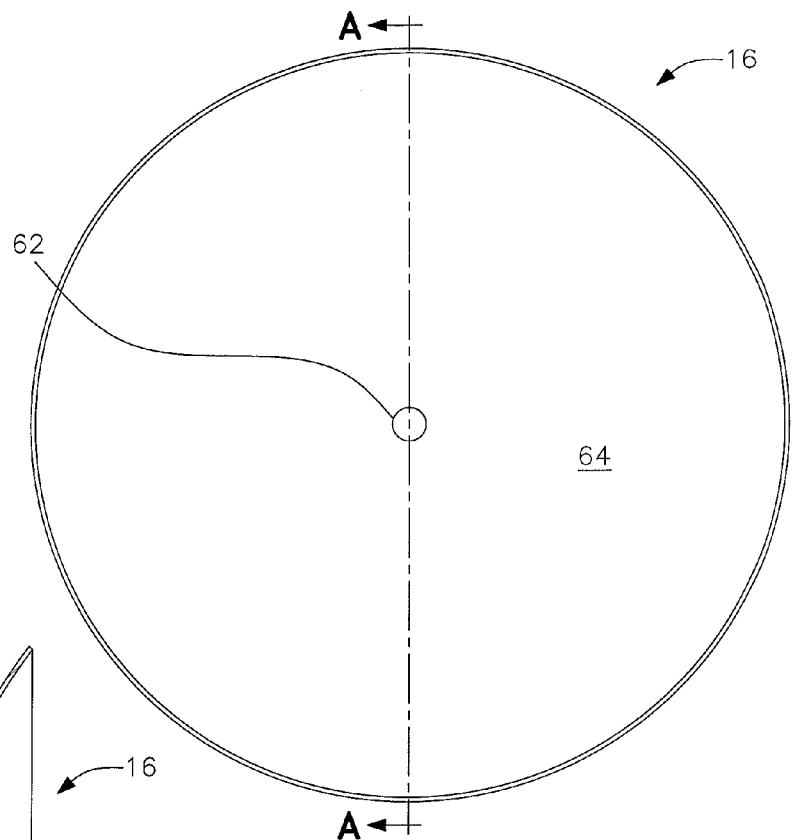
FIG. 7C is a bottom view of the baffle shown in FIGS. 7A and 7B.
Figure 7D:
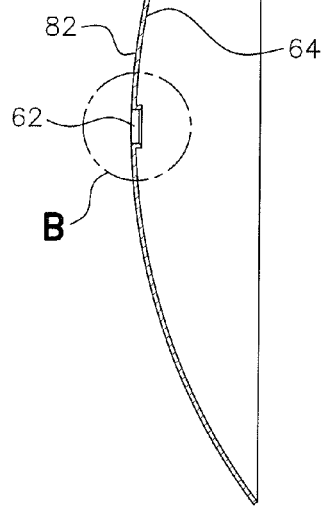
FIG. 7D is a cross sectional view taken along line A-A of FIG. 7C.
Figure 7E:
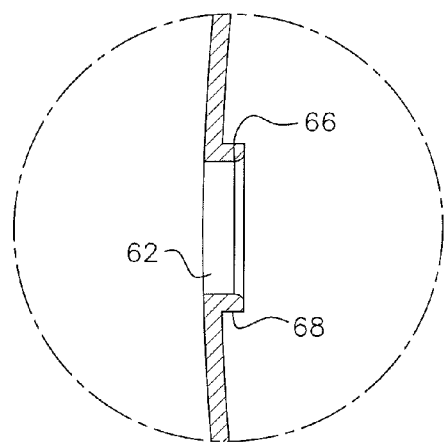
FIG. 7E is an enlargement of Detail B of FIG. 7D.

FIGS. 7A-7D show various views of the dome-shaped baffle 16 which includes a central aperture 62 that receives the center pole 14. The underside 64 of the baffle is concave as can be seen in FIG. 7D and includes a circular ridge 66 around the central aperture 62 as best seen in the FIG. 7E enlarged view. The inner diameter of the spring 24 is larger than the outer diameter 68 of the ridge 66 so that the top of the spring 24 fits over the ridge 66 and is seated against the underside 64 of the baffle 15 around the ridge 66 when the feeder 10 is assembled.

Figure 8A:
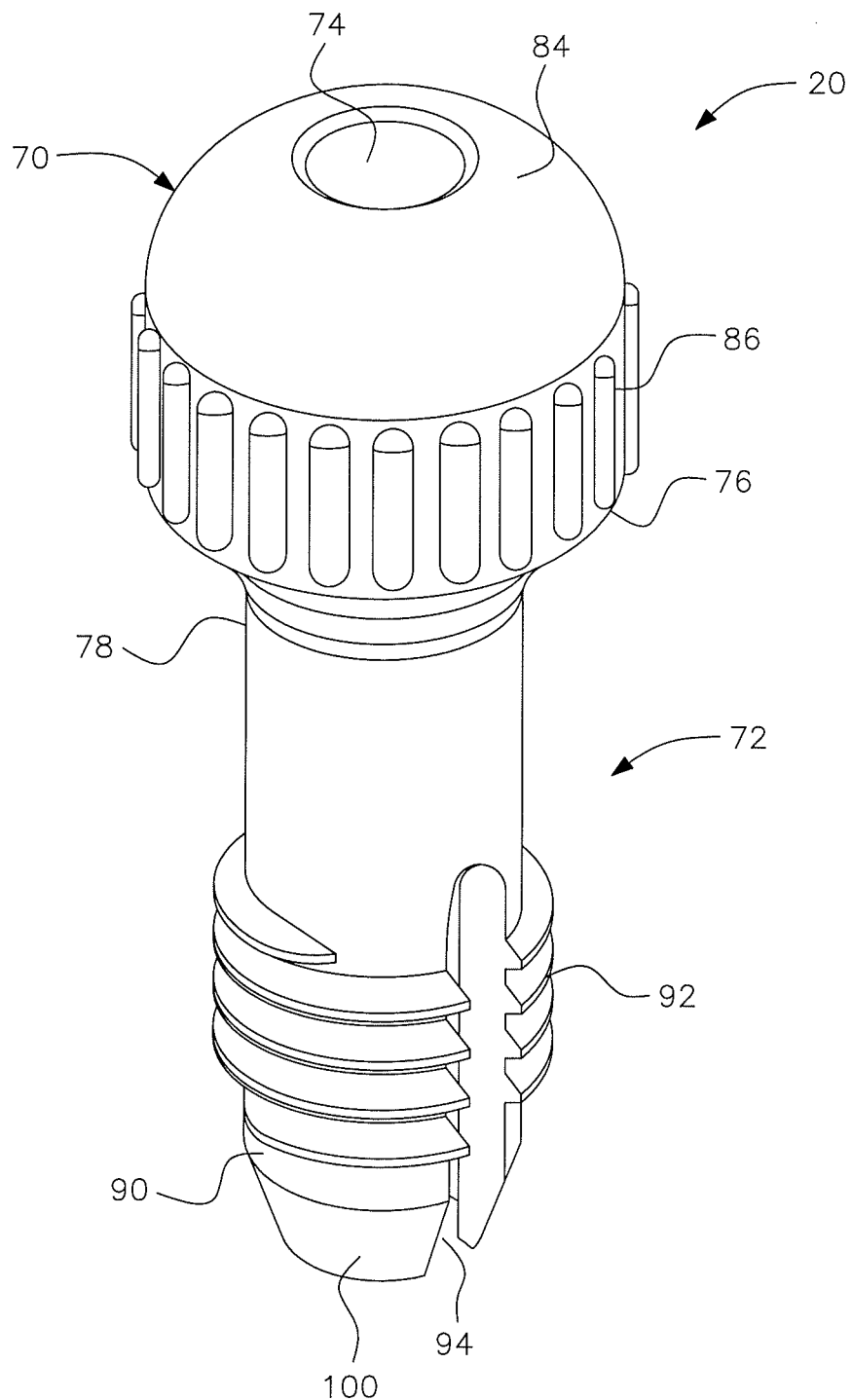
FIG. 8A is an upper perspective view of the locking bolt for the platform bird feeder shown in FIGS. 1-3.
Figure 8B:
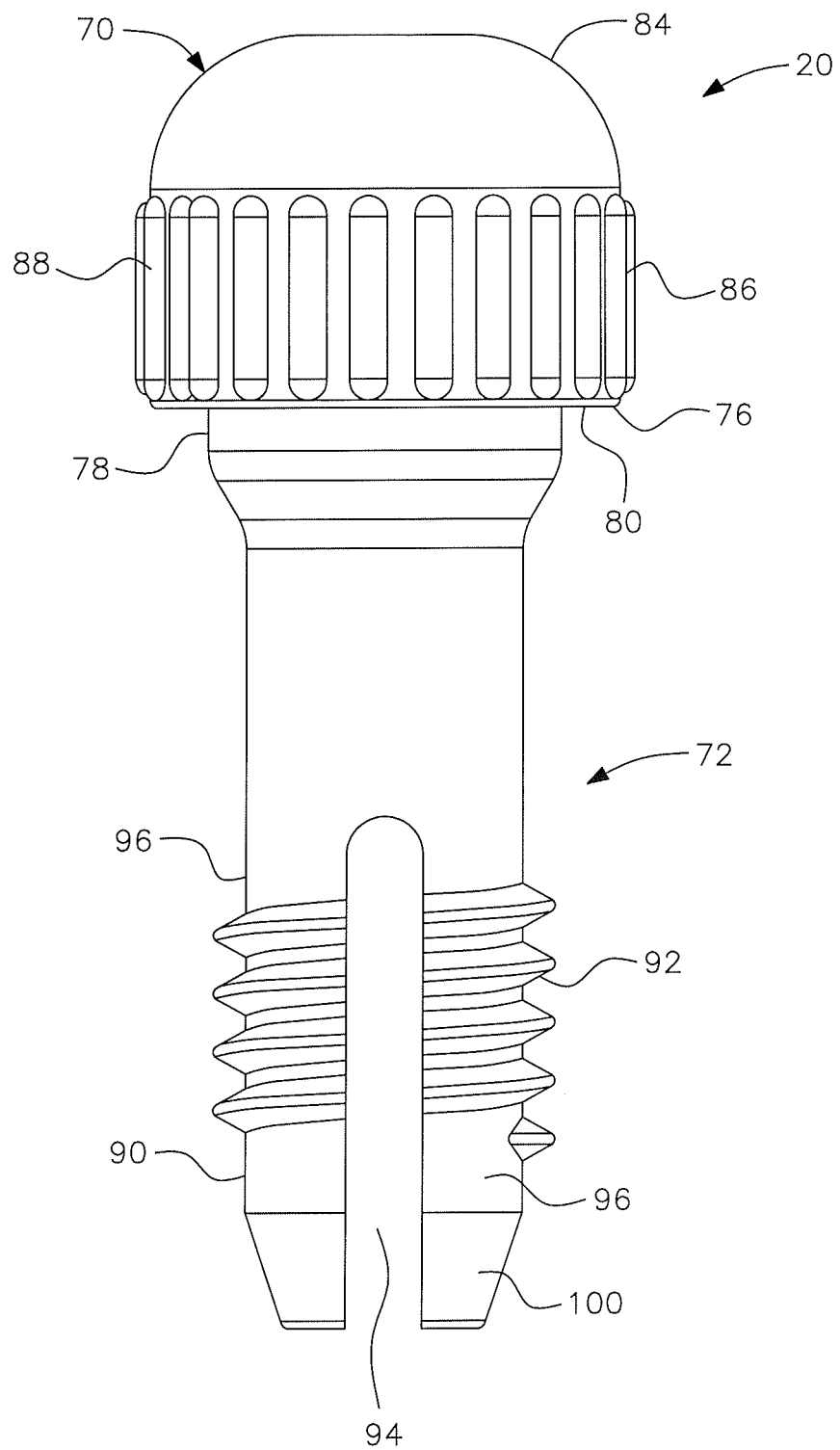
FIG. 8B is a side view of the bolt shown in FIG. 8A.

FIGS. 8A-8C depict various views of the locking bolt 20 which includes a head generally designated by reference numeral 70 and a shaft generally designated by reference numeral 72. The bolt 20 has a longitudinal bore 74 through both the head 70 and the shaft 72 for receiving the center pole 14. The diameter of the bottom 76 of the head 20 is larger than the diameter of the top 78 of the shaft 72 so that the lower edge of the head forms a radially extending seating surface 80. The diameter of the head 20 is also greater than the diameter of the central aperture 62 of the baffle 16. As a result, the seating surface 80 is in abutment with the top 82 of the baffle around the central aperture 62 when the feeder 10 is assembled.

In the embodiment shown, the head 20 has a generally dome shaped top 84 and ribbed sides 86. The ribbed sides 86 assist the user in holding the head 20 to prevent rotation when tightening the locking nut 22 on the bolt shaft 72. As best seen in FIG. 8D, the ribs 88 are preferably rounded which makes gripping of the bolt more comfortable for the user.

The shaft 72 of the bolt 20 has an upper portion 78 adjacent the head 20 and a lower portion 90 with external threads 92. The lower portion 90 has an axially extending channel formed by two relief cuts 94, one cut 94 through each symmetrical side 96 of the lower portion. While two relief cuts 94 are shown, three, four or more cuts could be made in the lower portion 90.

Figure 10A:
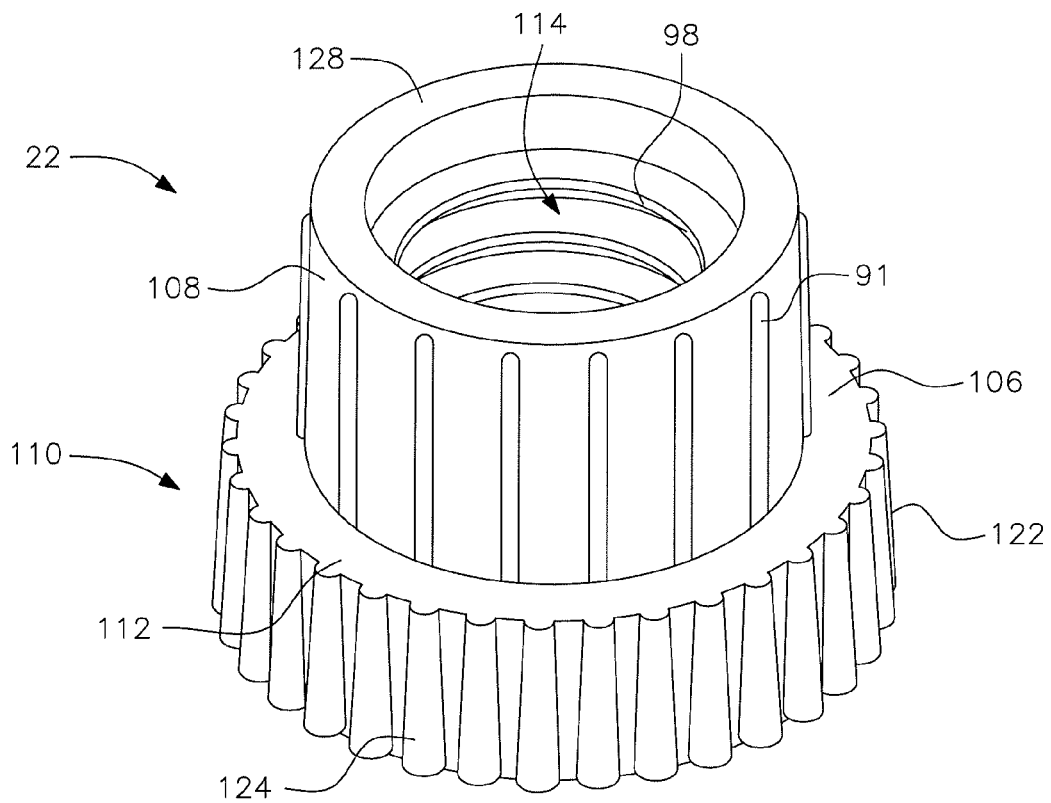
FIG. 10A is an upper side perspective view of the locking nut for the platform bird feeder shown in FIGS. 1-3.
Figure 10B:
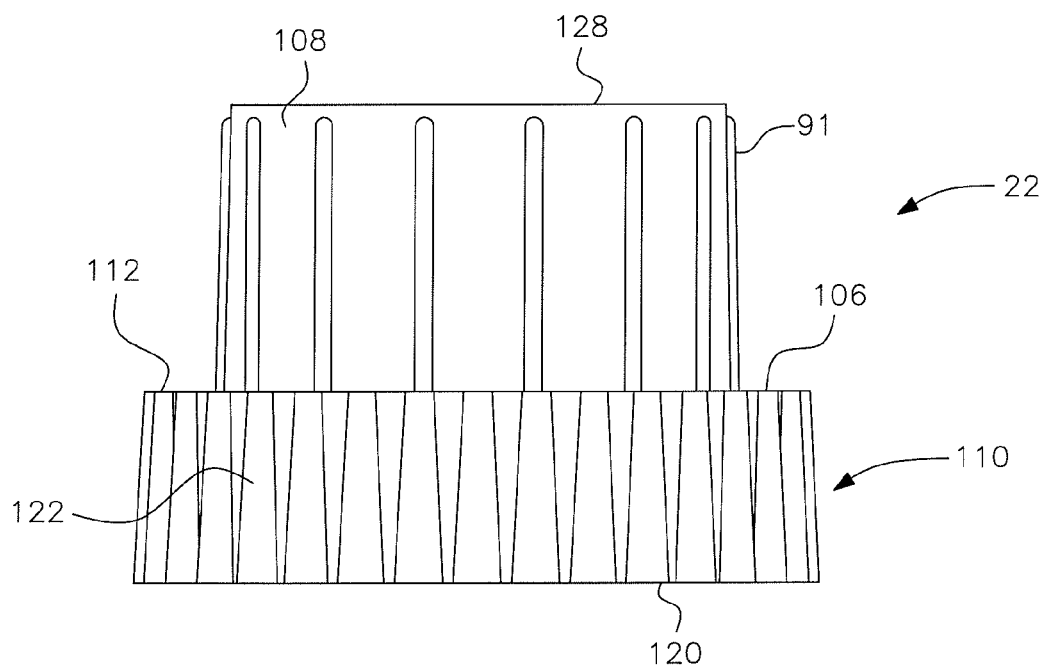
FIG. 10B is a side view of the locking nut shown in FIG. 10A.

The relief cuts 94 enable the symmetrical sides 96 of the bolt 20 to be pinched against the pole 14 when the locking nut 22 is screwed onto the threads 92 and tightened around the lower portion 90, locking the bolt 20 in a desired position on the pole. The threads 92 are pitched to engage with corresponding threads 98 on the locking nut 22 (see FIGS. 10A and 10D). The two symmetrical sides 96 at the lower portion 90 of the shaft 72 have a tapered end 100 with a smaller diameter than the lower portion 90. While the sides are discloses herein as symmetrical, it is also possible to have sides of different sizes by offsetting the relief cuts from the center of the shaft. The symmetrical sides are preferred, however.

As shown in FIG. 9, the spring 24 is a coiled element or compression spring as is known in the art. The spring 24 fits over the lower portion 90 of the bolt as shown in FIGS. 1 and 2. The top 102 of the spring 24 is seated around the ridge 66 on the underside 64 of the baffle 16 as described above. The bottom 104 of the spring 24 is supported on ledge 106 of the locking nut 22 as will be described hereinafter.

FIGS. 10A-10D provide various views of the locking nut, generally designated by reference numeral 22. The nut 22 includes a generally cylindrical neck 108 and a base generally designated by reference numeral 110 that is concentric with, and has a larger diameter than, the neck 108. The difference in diameters creates the ledge 106 on the upper surface 112 of the base upon which the spring 24 is seated when the feeder is assembled.

An axial central bore generally designated by reference numeral 114 extends through the base 110 and the neck 108 to accommodate the center pole 14. The upper part 116 of the bore 114 in the neck 108 is generally cylindrical, while the lower part 118 of the bore 114 in the base 110 (see FIG. 10D) is tapered inwardly. The bore upper part 116 includes internal threads 98 for engagement with the external threads 92 on the lower portion 90 of the bolt 20. The outer wall of the neck may have axial ridges 91 that serve to limit sideways movement of the lower end of the spring (see FIG. 10A). Alternatively, the entire outer diameter of the neck may be made larger to achieve the same effect. The ridges also facilitate molding of the internal threads 98.

As noted above, the bore 118 in the base 110 of the nut 22 tapers to a bottom opening 119 which has a diameter 121 smaller than the outer diameter of the shaft 72 of the bolt 20. The tapered ends 100 of the symmetrical sides 96 fit into the base bore 118 and are squeezed together by the tapering bore 118 as the nut is tightened on the bolt 20. When fully tightened, the tapered ends 100 may extend through the bottom opening 119 in the nut and be visible from the bottom surface 120 of the base 110.

Similarly to the head 70 of the bolt 20, the base 110 of the nut 22 has ribbed sides 122 to assist the user when tightening the nut onto the locking bolt. As best seen in FIG. 10C, the ribs 124 are rounded which makes rotation of the nut more comfortable for the user while still providing a good gripping surface. The bottom surface 120 of the nut base 110 is flat but could have other shapes and/or curvatures.

While the adjustable securing mechanism 18 is embodied herein as a locking bolt 20, locking nut 22 and spring 24, other mechanisms could be used to mount the baffle 16 to the pole 14 while providing for height adjustment and the present invention is intended to include all such mechanisms.

Also, as illustrated in the drawings and described herein, the platform 12 and baffle 16 are generally circular with the baffle slightly larger to overhang the outer edge 32 of the platform. Other shapes and sizes will occur to those skilled in the art and such alternate shapes and sizes are encompassed within the present invention. Further, other shapes for the dome-shaped baffle 16 could be used such as conical, pyramid and the like without departing from the present invention.

To assemble the feeder, the user first passes the lower portion 58 of the pole 14 through the aperture 74 in the locking bolt 20 starting from the head 70. The baffle 16 is then mounted on the pole by passing the pole 14 through aperture 62 starting from the top side 82 of the baffle. Next, the spring 24 is placed over the shaft 72 of the bolt 20, and then the pole 14 is passed through the bore 114 in the locking nut 22, starting from the neck 108. The nut can then be screwed onto the shaft 72 of the bolt 20 until the tapered ends 100 reach the base bore 118, at which point the baffle is secured to the pole by the adjustable securing mechanism 18. The nut 55 is screwed onto the threads 60 at the bottom end 58 of the pole, and then the pole is inserted through the aperture 48 in the grate 26. The bottom end 58 of the pole 14 is thereafter threadedly engaged with the internal threads 42 of the boss 40. When fully tightened, the grate 26 and center pole 14 are held firmly against either the annular ledge 36 or, when provided, the flanges 29 on the base platform 12 by the threaded connection between the pole and the boss and the locking action of nut 55.

Figure 11:
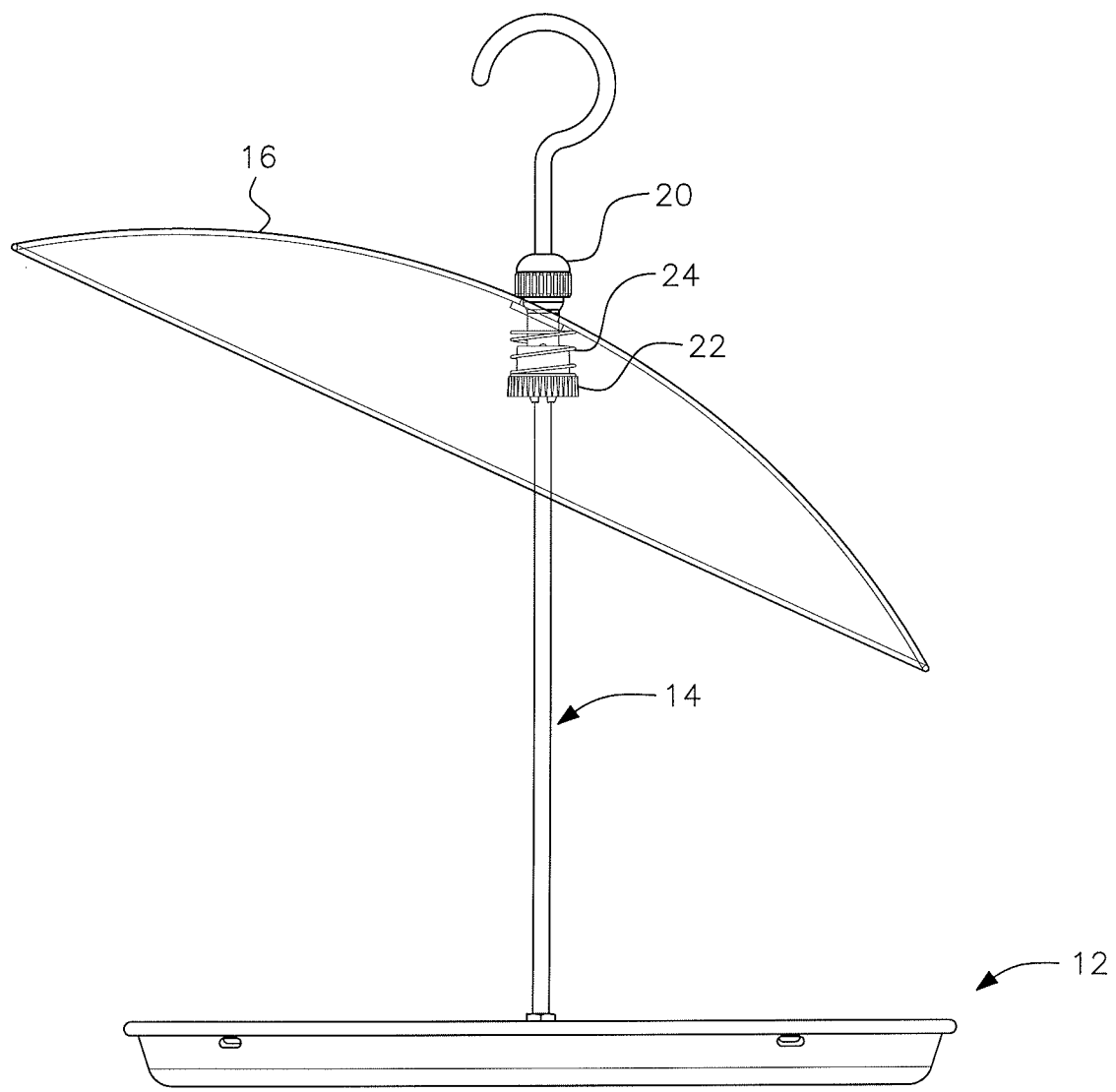
FIG. 11 is a side view of the assembled feeder shown in FIG. 1 when the baffle is tilted in response to the application of force on one side of the baffle.

When the feeder is assembled as shown in FIG. 1, the baffle rides on the upper end 102 of the spring 24 and is held against the center pole 14 by the locking bolt 20 and locking nut 22 at a height chosen by the user. When the nut is fully tightened against the bolt, the spring is not fully compressed as can be seen in FIG. 1. Therefore, when weight is applied to the top 65 of the baffle 16, the spring will further compress to allow the baffle to move downwardly until the ridge 66 on the underside 64 of the baffle comes into abutment with the upper edge 128 of the neck 108 of the nut. At the same time the spring provides for tilting movement of the baffle when force is applied to one side of the baffle as shown in FIG. 11. The result is a wobbly baffle that prevents squirrels from remaining thereon should they attempt to land on the baffle.

Adjusting the height of the baffle thereafter is very simple. The user has only to loosen the nut 22 until the squeezing pressure on the symmetrical sides 90 is released, allowing the adjustable securing mechanism 18 to slide up or down on the pole. When the desired height is reached, the user tightens the locking nut 22 onto the locking bolt 20 which again squeezes the sides 90 to pinch the pole and hold the adjustable securing mechanism in place.

To disassemble the feeder, the user simply performs the assembly steps in reverse, starting by unscrewing the bottom end 58 of the pole from the base platform, sliding off the grate 26, and then unscrewing the nut 55. The user then unscrews the nut 22 and slides it off the lower portion 58 of the pole 14, followed by the spring 24, the baffle 16 and the bolt 20.

As described herein, the platform feeder of the present invention provides an adjustable baffle which allows the consumer to decide what size of bird can be fed by controlling the seed access space between the baffle and the platform. The baffle also deters squirrels from landing on the feeder as the squirrel's weight causes the baffle to wobble, resulting in the squirrel sliding off the baffle and past the platform to the ground. The grate mounted on the base also serves to block squirrel access to the seed in the feeder.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A platform bird feeder comprising: a center pole; a base platform connected to a bottom end of the center pole; a baffle having a central aperture, said baffle being spring-biased on the center pole to provide tilting movement of the baffle relative to the center pole when a weight is applied to the baffle off-center; and an adjustable securing mechanism for movably mounting the baffle on the center pole at a plurality of different heights so that a height of the baffle on the pole relative to the base platform is adjustable by a user, said adjustable securing mechanism including a locking bolt, a locking nut and a spring, the bolt having a head and a threaded shaft, the threaded shaft passing through the aperture in the baffle and being inserted through a center of the spring, the head of the bolt being on a top side of the baffle, the nut being secured to the threaded shaft and in abutment with the spring on an underside of the baffle, tightening of the nut compressing the spring against the underside of the baffle.

2. The platform bird feeder as set forth in claim 1, wherein the base platform includes a seed tray with an upwardly curved rim, a top edge of the rim having a lip that forms a ledge, the feeder further comprising a grate mounted on top of the ledge on the base platform above the tray.

3. The platform bird feeder as set forth in claim 1, wherein the threaded shaft of the bolt has at least one axially extending relief cut that divides a lower part of the shaft into at least two sides having tapered ends, the relief cut enabling the sides to be squeezed toward one another to pinch the pole when the nut is tightened on the shaft.

4. The platform bird feeder as set forth in claim 2, wherein the nut has an axial bore extending through the neck and the base, an inside diameter of said bore tapering in the base, the tapered ends of said symmetrical sides being received in said tapered base bore when the feeder is assembled.

5. The platform bird feeder as set forth in claim 1, wherein the underside of the baffle has a ridge around the central aperture, a top end of said spring encircling the ridge.

6. The platform bird feeder as set forth in claim 1, wherein the nut has a base and a neck, the base having a greater outer diameter than the neck so that an upper surface of the base forma a ledge, a lower end of said spring being compressed against the ledge when the feeder is assembled.

7. The platform bird feeder as set forth in claim 1, wherein the bottom end of the pole is threaded, said base platform including an upwardly directed boss having a threaded central aperture for threadedly being coupled to the bottom end of the pole.

8. The platform bird feeder as set forth in claim 1, wherein the tightening of the nut compresses the spring directly against the underside of the baffle but does not fully compress said spring, said central aperture in the baffle being larger than an outer diameter of the shaft to create a gap allowing the baffle to tilt relative to the center pole and further compress one side of the spring when sufficient weight is applied to one site of the baffle.

9. A platform bird feeder comprising: a center pole; a base platform connected to a bottom end of the center pole; a tiltable baffle having a central aperture; and an adjustable securing mechanism enabling the user to movably mount the baffle on the pole at any desired height above the base platform, said adjustable securing mechanism including a vertically movable height adjustment component and a spring mounted between an underside of the baffle and the height adjustment component, the vertically movable height adjustment component including a squeezable member and a tightening member both of which have openings to receive the pole, the squeezable member including a locking bolt with a threaded shaft having an axially extending relief cut that divides a lower part of the shaft into two sides having tapered ends, the relief cut enabling the sides to be squeezed toward one another to pinch the pole when the tightening member is tightened on the shaft to constrict the squeezable member so that the squeezable member is frictionally secured at a specific height on the pole and held there by the tightening member; and upward vertical movement of said height adjustment component toward the baffle partially compressing the spring while allowing the baffle to wobble when mounted at said height, said partial compression of the spring allowing one side of the spring to be further compressed when weight is applied to a first side of the baffle so that the first side of the baffle tilts downwardly relative to the center pole while a second side of the baffle opposite the first side tilts upwardly relative to the center pole.

10. The platform bird feeder as set forth in claim 9, wherein the squeezable member has a head with an outer diameter larger than the baffle central aperture and a shaft, the shaft extending through the central aperture in the baffle, the tightening member being engaged with the shaft of the squeezable member on the underside of the baffle.

11. The platform bird feeder as set forth in claim 9, wherein the baffle rides on an upper end of said spring, said upper end being in abutment with the underside of the baffle.

12. The platform bird feeder as set forth in claim 9, wherein the tightening member includes a nut having a base and a neck, the base having a greater outer diameter than the neck so that an upper surface of the base forms a ledge, a lower end of said spring being compressed against the ledge when the feeder is assembled.

13. The platform bird feeder as set forth in claim 12, wherein the squeezable member includes a locking bolt, the shaft of which is threaded, the threaded shaft of the locking bolt having an axially extending relief cut that divides a lower part of the shaft into two sides having tapered ends, the nut having an axial bore extending through the neck and the base, an inside diameter of said bore being smaller in the base than in the neck, the tapered ends of said sides being received in said base bore when the feeder is assembled.

* * * * *